(12) United States Patent
Candelore (10) Patent No.: US 8,707,380 B2
(45) Date of Patent: *Apr. 22, 2014

(54) WIRELESS CONTROL CHANNEL AND BACK-CHANNEL FOR RECEIVER

(75) Inventor: Brant L. Candelore, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/525,551

(22) Filed: Jun. 18, 2012

(65) Prior Publication Data

US 2012/0260297 A1 Oct. 11, 2012

Related U.S. Application Data

(63) Continuation of application No. 11/980,035, filed on Oct. 30, 2007, now Pat. No. 8,225,366.

(51) Int. Cl.
*H04N 7/173* (2011.01)

(52) U.S. Cl.
USPC ............... 725/120; 725/64; 725/65; 725/105; 725/110; 725/118; 725/119; 725/121; 725/123

(58) Field of Classification Search
None
See application file for complete search history.

(56) References Cited

U.S. PATENT DOCUMENTS

| | | | |
|---|---|---|---|
| 5,812,931 A * | 9/1998 | Yuen ............................. 725/123 |
| 5,990,882 A | 11/1999 | Heinonen et al. |
| 6,240,555 B1 | 5/2001 | Shoff et al. |
| 6,961,556 B2 | 11/2005 | James et al. |
| 8,250,614 B1 * | 8/2012 | Ellis et al. ........................ 725/87 |
| 2002/0032904 A1 * | 3/2002 | Lerner ............................. 725/14 |
| 2003/0070174 A1 | 4/2003 | Solomon |
| 2003/0078986 A1 | 4/2003 | Ayres et al. |
| 2003/0145334 A1 | 7/2003 | Motoe et al. |
| 2003/0182658 A1 | 9/2003 | Alexander |
| 2004/0142661 A1 * | 7/2004 | Lane et al. ................... 455/41.2 |
| 2005/0132402 A1 | 6/2005 | Gray et al. |
| 2007/0143679 A1 | 6/2007 | Resonor |
| 2007/0266414 A1 * | 11/2007 | Kahn et al. .................... 725/113 |
| 2008/0263618 A1 | 10/2008 | White |

FOREIGN PATENT DOCUMENTS

| | | |
|---|---|---|
| JP | 2005-523662 | 8/2005 |
| WO | WO 03/090480 | 10/2003 |

OTHER PUBLICATIONS

Japanese Office Action and translation, Japanese Patent Application No. 2010-532102 (related to US 8,225,366), Mar. 14, 2013.
Henry, James S. et al., "The Future of Mobile Data," Sag Harbor Group White Paper, pp. 65-67, Feb. 2002.

* cited by examiner

*Primary Examiner* — Chenea Smith
(74) *Attorney, Agent, or Firm* — Miller Patent Services; Jerry A. Miller (57) ABSTRACT

A method and apparatus for integrating a bi-directional control channel into an entertainment display device to deliver content and exchange control information. The system collects request and response information from the entertainment display device. The system also provides format translation of received and collected content to and from a plurality of formats such as N-PCS technology formats and video display formats in such a manner that the integrated system is independent of broadcasters, satellite, IPTV and cable operators. This abstract is not to be considered limiting, since other embodiments may deviate from the features described in this abstract.

16 Claims, 4 Drawing Sheets

WIRELESS CONTROL CHANNEL AND BACK-CHANNEL FOR RECEIVER

CROSS REFERENCE TO RELATED DOCUMENTS

This application is a continuation of allowed U.S. patent application Ser. No. 11/980,035 filed Oct. 30, 2007 which is hereby incorporated herein.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

As of this writing, content receiver devices offered by service providers such as cell phones, cable, satellite and IPTV set-top boxes are typically manufactured by OEM manufacturers under control by the service providers. The service providers control their distribution networks and limit access to any back-channel that may exist. In the case of broadcast TV, the over-the-air service has been typically one-way without any back-channel. Satellite service often uses telephone for a back-channel in order to deliver a reportback of impulse pay-per-view movies watched and to deliver decryption keys for programs. However, phone connection is inconvenient in many cases since the TV or playback device is often located away from the phone jack and does not have enough bandwidth to satisfactorily deliver content.

The lack of an independent communication forward channel and back-channel, for sending content and messages and receiving feedback or response messages, places inherent limitations on the type of playback device that consumer electronic (CE) companies can make. Ideally the CE companies would be ale to make a playback device which might not only receive the service (cable, satellite, IPTV, and broadcast TV) but also allow other enhanced capability, e.g. interactive services that could bring additional value to the customer such as information or related content, etc.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Certain embodiments may be implemented using one or mores programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Content may be embodied as audio, video, multimedia or interactive data that may be encoded for entertainment, training, and artistic purposes. Content may be distributed as package media, broadcast streams and Internet streams. Package media includes compact disc (CD), digital versatile disc (DVD), high definition DVD (HD-DVD), Blu-ray Disc (BD) and VHS tape. Content players include package media players, handheld players, cell phones, digital assistants, set-top boxes, televisions, radios, and personal computers.

Devices offered by service providers such as cell phones and cable, satellite and IPTV set-top boxes are typically manufactured by OEM manufacturers under control by the service providers. The service providers control their distribution networks and limit access to any back-channel that may exist. In the case of broadcast TV, the over-the-air service has been typically one-way without any back-channel.

The lack of an independent communication forward channel and back-channel, for sending content and messages and receiving feedback or response messages, places inherent limitations on the type of playback device that consumer electronic (CE) companies can make. Ideally the CE companies would be able to make a playback and/or display device which might not only receive the service (cable, satellite, IPTV, and broadcast TV) but also allow other enhanced capability, e.g. interactive services that could bring additional value to the customer such as information or related content, etc. The discussion below will be focused on televisions, however, the description could apply equally as well to the other content player devices described above. And, even the television may have integrated capability to receive cell phone, cable, satellite and IPTV services and not just "free" over-the-air content.

Historically, viewing television programming has been a one-way experience; content such as entertainment programming, advertising, news, educational programs, and other programming are sent to the viewer. But new interactive features will require 2-way capability. If the 2-way communication capability does not exist, as is typically the case for over-the-air broadcasts, it would be new capability. If offered in conjunction with cable, IPTV or satellite service, it would bypass the service providers' own capability using the cable out-of-band, DOCSIS, DSL modem or telephone communication.

An apparatus and method for communicating directly with an entertainment display device, such as a television, would be an enhancement not only of a viewers experience, but also allow content providers (as opposed to the service providers) to solicit and receive immediate report back and feedback data directly from viewers, in real time. In the case of broadcast TV, such apparatus would allow broadcasters to get feedback from customers for the first time. Enabling such a two-way communication pathway from the content provider to the viewer and back again, would enable true targeted advertising, provide more instantaneous sales transactions, provide a means for truly surveying the viewing habits of users in real time, and provide a mechanism for delivering personalized ads that are outside the control of an intermediary such as broadcasters, satellite, IPTV or cable operators.

Providing such a bi-directional messaging capability that is directly connected to an entertainment display device, e.g. television, also provides a more open forum for viewers comments. This capability also provides for a wider spectrum of content, allowing a real-time interactive response to questions posed and information sought by any content provider that is interested in what their viewers think, want, or need. There is a need for a relatively ubiquitous, bi-directional, wireless communication channel connected directly to an entertainment display device to achieve any or all of these goals, and to set the stage for levels of interaction that cannot yet be considered possible. Certain embodiments consistent with the invention may be used to enable achieving such goals, but the present invention should not be construed to be limited exclusively to systems and methods that are used to achieve such goals.

Figure 1:
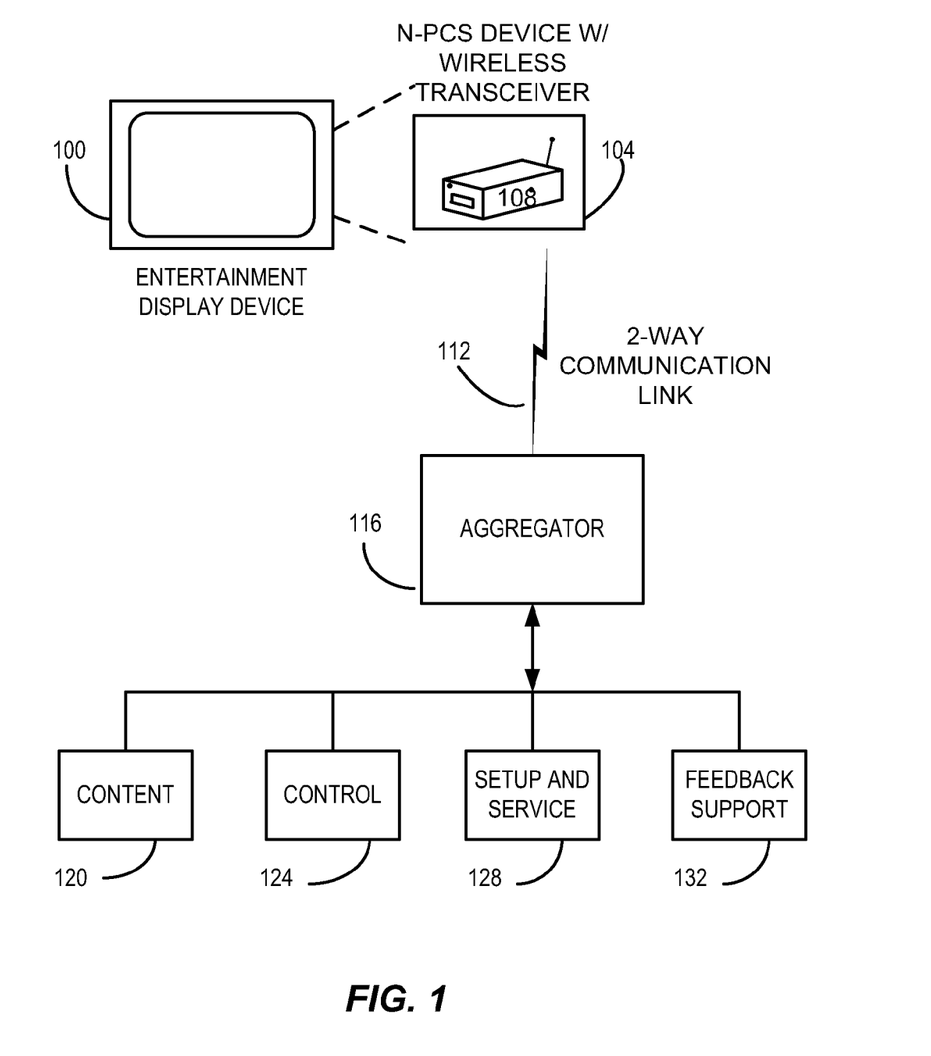
FIG. 1 is a diagram of system connectivity consistent with certain embodiments of the present invention.

Turning now to FIG. 1, consistent with certain embodiments of the invention this figure presents an exemplary view of one possible system configuration. In this exemplary configuration, the instant control channel 104 is in direct communication with an entertainment display device 100, for purposes of illustration this entertainment display device 100 may be a television. The control channel device 108, is implemented as a Narrow band Personal Communications Services (N-PCS) technology device. This device is an N-PCS control device that establishes a communication pathway between an entertainment display device, such as a television in a viewer location, and the N-PCS control device. The bi-directional communication channel between an N-PCS control device and the entertainment display device may be implemented in exemplary embodiments through a direct electrical connection, through a wired communication channel, or through a remote connection using a wireless connection between the entertainment display device and the N-PCS control device. In an exemplary embodiment, the N-PCS control device may be an electrical connection to, and integrated with the entertainment display device, for example, mapped as a device on the display device's main memory bus or attached using IEEE1394, Ethernet, USB or USB2 connections.

The N-PCS control device utilizes N-PCS technology services to establish and maintain a bi-directional, wireless communication channel between the entertainment display device and an external content provider implementation. N-PCS technology content provider implementations are available from several manufacturers such as the FLEX™ standard from Motorola, Inc., and the Ambient Information Network from Ambient Devices Inc.

It should be noted that WIMAX could be used instead of N-PCS technology. Like N-PCS, it has or will soon have ubiquitous coverage around metropolitan centers in the US, Canada and parts of Mexico. It is also possible for 802.11 a-g to be used which capitalizes on a preexisting data service in the home. In the illustrative examples provided, N-PCS is described, but the invention should not be so limited in view of the above.

In an exemplary embodiment, the N-PCS control device 104 establishes and maintains a wireless, bi-directional, limited interactive channel between the N-PCS control device and a content provider. This limited interactive channel provides back channel access for content and control information exchange with a television without the need for a connection through cable, IPTV or telephone systems. The back channel exchanges data through the use of an established N-PCS technology provider such as those provided by one of the manufacturers named above, for example. This technology could be fielded into any television or other entertainment display device where such services are available. The N-PCS technology control channel capability 104 can provide an independent delivery mechanism for entitlement content and report back data for transactions or purchase requests, as well as setup or maintenance information for the display device. N-PCS paging technology is independent of cable out-of-band messaging, modems, DSL modems, or telephone modems and, thus, is independent of broadcasters, satellite, IPTV and cable operators.

The bi-directional communication channel 112 connectivity is established by an integrated wireless transceiver 108 which amplifies the signal for transmission to an aggregator 116. The wireless transceiver may be integral to the N-PCS device or the entertainment device in accordance with certain embodiments or may be otherwise configured without departing from embodiments consistent with the present invention. In an exemplary embodiment, the aggregator 116 is an external server that pulls data from content providers for transmission to the control channel device 104 and receives report back, maintenance, and other data from the entertainment display device user. The aggregator 116 receives content from any of one or more content providers 120, receives control information from providers of content that requires a return signal 124, setup and service information from companies such as equipment manufacturers and maintenance companies 128, and feedback requests from any company that wishes to interact with a user of the entertainment display device 132. The aggregator 116 then provides control and direction for the content to be delivered to the N-PCS control device 104 that is in communication with the entertainment display device. The aggregator 116 then may receive any return signals such as report back, feedback, or maintenance data from the N-PCS control device 104 for delivery to the originator of such requested data.

Figure 2:
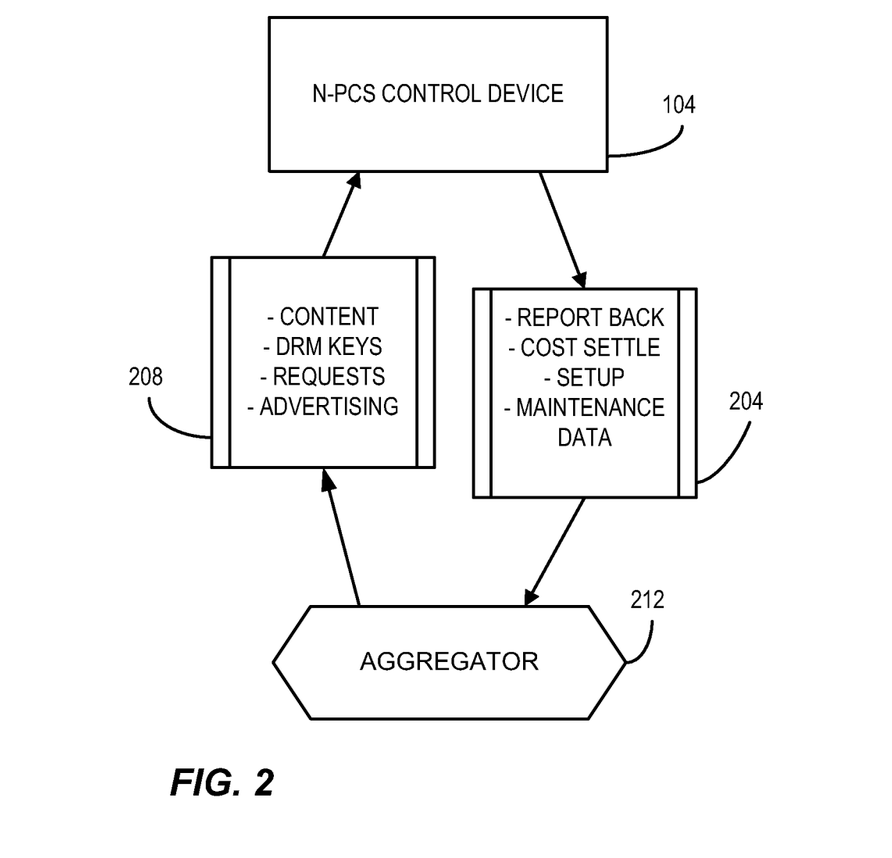
FIG. 2 is an illustrative data transfer diagram consistent with certain embodiments of the present invention.

Turning now to FIG. 2, consistent with certain embodiments of the invention this figure presents a view of the content transfer and some indication in this exemplary embodiment of the direction in which content may flow.

In an exemplary embodiment, content and control data are sent from an external aggregator to the N-PCS control device 104. Data sent to the control device is intended either for display to a user on the entertainment display device 100, or command data for which a response is appropriate. Content and control data received at the N-PCS control device may include any data for which a content provider might desire an interactive response, data a user might require to unlock content, or any other type of informational content. This data may include digital rights management keys to unlock encrypted content, requests to the user or to the entertainment display device that require a response, advertising content that has an interactive component, as well as informational or entertainment content that is appropriate to be communicated across the wireless communication channel 208.

In an exemplary embodiment, the data sent from the N-PCS control device may include any data to be communicated from the user or entertainment display device such data as report back data intended for advertisers, cost settlement data intended for corporations or cable operators who provide content to a user on a pay-per-view basis or as directed sales of merchandise. The cost settlement data may be used to certify purchases using the system. Setup and maintenance data 208 may be sent to a corporation that created the display device or a separate corporate entity that is charged with the maintenance of the display device 100 or control channel 104 equipment. This information could be sent as a timed message, in response to an interrogative on the part of the corporation, or may be sent by the control channel 104 or display device 100 as the result of a maintenance issue that requires attention.

Again, this ability is based upon the N-PCS bi-directional control channel 104 in an exemplary embodiment that operates independently of cable operators and broadcaster, and so is able to integrate with and transfer content and control information with any of a plurality of content providers. In an exemplary embodiment, this provides broadcasters and other content providers with a means for enhancing service offerings with interactive offerings that provide instant report back to content providers and users alike.

Figure 3:
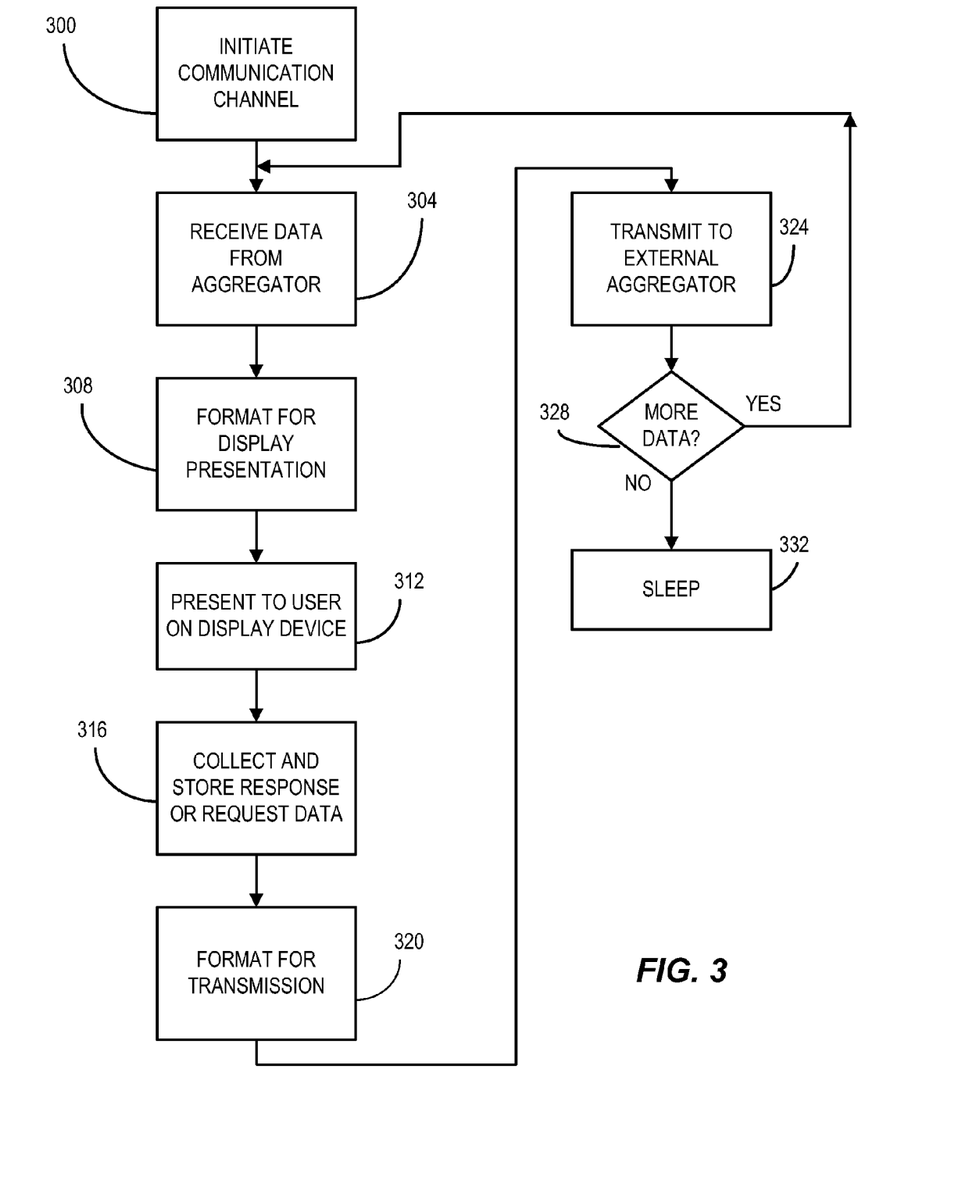
FIG. 3 is a diagram of a user data request consistent with certain embodiments of the present invention.

Turning to FIG. 3 in certain embodiments of the invention the direct connection from the user controlling the entertainment display device provides multiple opportunities for the user to request and receive content and responses to requests directly from content providers. In an exemplary embodiment this direct connection permits the transfer of desired content and information with no intervention from any other entity that would change or censor the communication.

In an exemplary embodiment the N-PCS control device operates to establish a bi-directional wireless communication connection directly with an external aggregator at 300 upon initial power-up of the entertainment display device into which the N-PCS control device is integrated. With the wireless communication channel established, the N-PCS control device receives data from the aggregator at 304 regarding any content that is waiting to be transferred to the entertainment display device. This content may include such data as welcome messages, advertising messages, requests for maintenance information from the entertainment display device, or any other message that has been accrued by the aggregator since the last time the system was in contact with the aggregator through the wireless communication channel. Upon receipt of the command, control, or other content, the N-PCS control device formats the content for presentation at 308 on the display screen of the entertainment display device. If the content consists of maintenance data requests from the entertainment display device, the message is not displayed to a viewer. If not, the formatted content is now presented to the user on the display of the entertainment display device at 312.

If required by the content received, the N-PCS control device collects responses from the user, or from the entertainment display device itself, and stores these responses in an internal digital memory storage array at 316. The N-PCS control device formats the collected responses into the format required for wireless transmission over the wireless communication channel at 320, and then transmits the formatted message content directly to the external aggregator at 324. The N-PCS control device then checks to see if there is more data to be received from the external aggregator at 328. If there is more data from the aggregator, the N-PCS control device receives the incoming content and begins the processing loop once again at 304. If there is no further content incoming from the external aggregator at this point the N-PCS control device will retire to a sleep mode at 332, awaiting the next incoming content communication from the external aggregator.

An additional exemplary feature of this direct connection is that a manufacturer of the entertainment display device 100 may provide an internal function for automated updates from the entertainment display device as to the health of the device, or request setup, service, or maintenance information that has been collected by the entertainment display device 100. This functionality can be automated such that reporting occurs at the instigation of the entertainment display device on an as-needed basis, or the data may be sent as an update through the N-PCS control device when requested. In this fashion, the direct connection may be used to provide better quality service for the viewer by the vendor of the entertainment display device 100.

Figure 4:
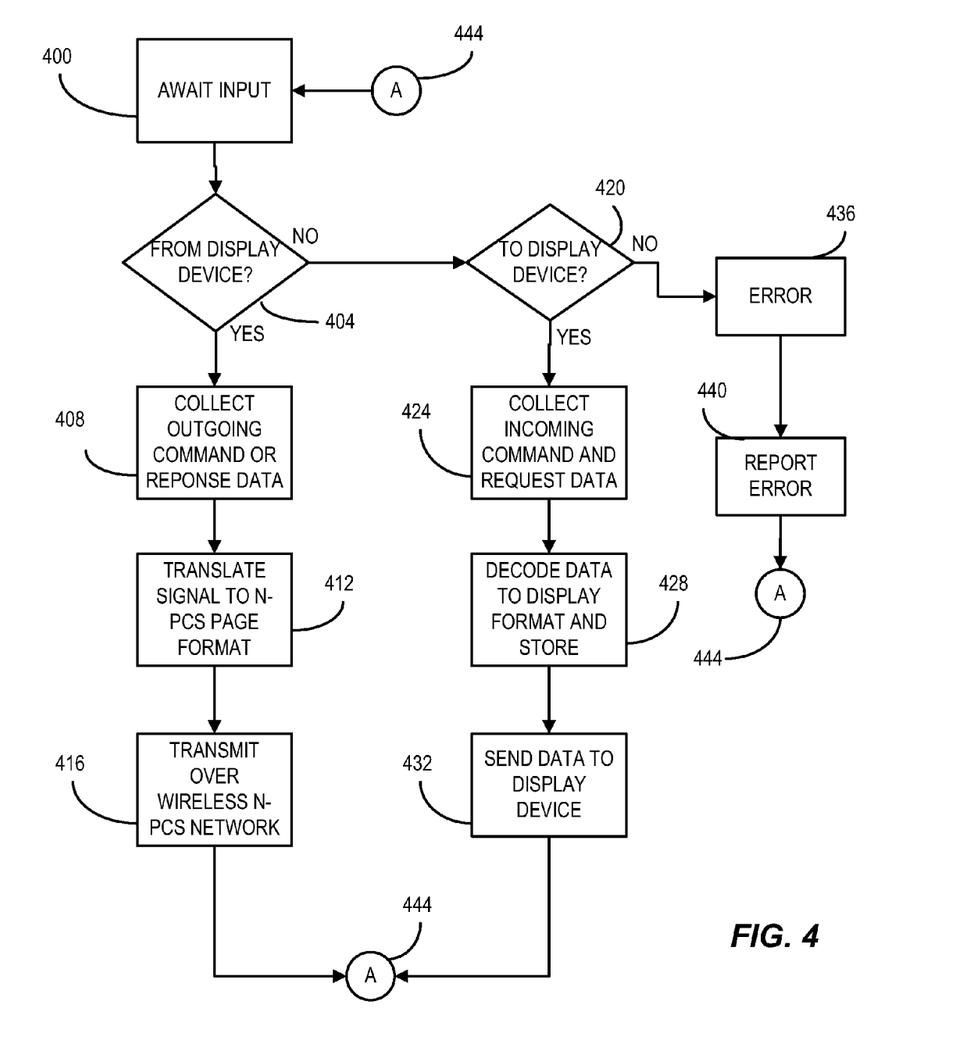
FIG. 4 is an illustrative control flowchart consistent with certain embodiments of the present invention.

Turning to FIG. 4, in certain embodiments of the invention the primary data control module, a software package implemented within the N-PCS control device 104, is in a constant state awaiting input 400. When an input arrives, the control channel 104 central processing module checks to see if the message is from the display device at 404 or from the aggregator 116 and is being transmitted to the display device 420. If the communication is from the display device at 404, the control channel 104 central processing module collects the outgoing message at 408. In certain embodiments the outgoing message may contain any type of control, response, feedback, or maintenance data that is being sent to the aggregator 116. The communications signal is then formatted for transmission as an N-PCS paging transmission signal at 412 and sent via wireless signal over the wireless N-PCS page network 416 to the aggregator 116. The control channel 104 central processing module then awaits the next communication action.

If the signal is incoming from the aggregator 116 to the control channel 104 central processing module, the control channel 104 collects the incoming communication at 424. The incoming communication is decoded from the N-PCS technology data format into a display ready format at 428 and the display ready communications are then sent to the display device 100 and displayed for a user at 432. The control channel 104 central processing module then awaits the next communication action.

If the control channel 104 central processing module cannot determine whether the incoming communication is from the display device 100 or from the aggregator 116, the module recognizes that the signal is not recognizable and is an error. The module routes the message to an error reporting module at 436, where an error message is sent both to the aggregator 116 and the user display device 100 for informational purposes at 440. The control channel 104 central processing module then awaits the next communication action at 400 via 444. Of course, those skilled in the art will appreciate that many variations are possible in the above embodiments in view of the present teachings.

Thus, a method for transmitting and receiving content and control communication with an entertainment display device involves providing a transmit and receive device in communication with the entertainment display device and adapted to establish bi-directional communication over a wireless communication channel using the wireless communication channel to establish a direct communication connection between said transmit and receive device and an external content aggregator; receiving entertainment and control content directly from said external content aggregator to the transmit and receive device over the established bi-directional, wireless communication channel; storing the received content, formatting the received content for presentation, and presenting the received entertainment and control content from the integral transmit and receive device on the display of said entertainment display device.

The device collects response data and content request data sent from a user in response to content displayed on the entertainment display device; stores the data within the integral transmit and receive device, and formats the received and collected content for transmission from said integral transmit and receive device; transmits directly to the external content aggregator using said wireless communication channel, and where the bi-directional, wireless communication channel can be a communication and control channel to perform bi-direction data transfer directly between said integral transmit and receive device and the external content aggregator operating independently of broadcasters and cable operators.

The bi-directional, wireless communication channel can be implemented through N-PCS paging technology in which the entertainment content may include encrypted and/or non-encrypted content. The control content may be comprised of advertising report back messages, program report back messages, cost settlement information, targeted advertising messages, viewing metrics, entertainment display setup messages, entertainment display maintenance messages, or any other message that may collect a response from a viewer. The entertainment display device may comprise a TV set or digital display device and the bi-directional, wireless communication channel may be used to deliver digital rights management information or entitlement keys to the entertainment display device.

An apparatus for content and control communication directly with an entertainment display device, consistent with certain embodiments has a processor, a communications device for communicating directly between the processor and an external content aggregator device using a direct bi-directional, wireless communication channel, and a data translation module integral to the processor for receiving and translating entertainment and control content over the bi-directional, wireless communication channel.

The apparatus also has a display module to request the display of content and response request information on the display of the entertainment display device, a control module for transferring stored data for display on the entertainment display device and collecting response and request commands from a user of the entertainment display device, and where the processor is integrated into the entertainment display device and performs bi-direction data transfer directly between said integral processor and the external content aggregator as an independent back channel.

The entertainment display device may be a TV or digital display device and the data translation module translates content arriving at the entertainment display device from an N-PCS technology message into content that may be displayed to a user.

The data translation module translates content sent from the entertainment display device into an N-PCS technology format suitable for transmission to an aggregator and the control module displays control and command messages to a user via the entertainment display device connected to the control module that may gather responses to control and command messages sent to a user.

In certain embodiments, one or more computer-readable storage media storing instructions used to control transmitting and receiving content and control communication with an entertainment display device, wherein when such instructions are executed on one or more programmed processors carry out a process comprising using a wireless communication channel to establish a direct communication connection between a transmit and receive device and an external content aggregator, wherein the transmit and receive device is integrated with an entertainment display device and adapted to establish bi-directional communication over a wireless communication channel.

In certain embodiments, the computer-readable storage media contains instructions for receiving entertainment and control content directly from said external content aggregator to said transmit and receive device over the established bi-directional, wireless communication channel, storing the received content, formatting the received content for presentation, and presenting the received entertainment and control content from the integral transmit and receive device on the display of the entertainment display device. The system also collecting response data and content request data sent from a user in response to content displayed on the entertainment display device, storing the data within the integral transmit and receive device, and formatting the received and collected content for transmission from said integral transmit and receive device. Transmitting directly to the external content aggregator using said wireless communication channel, where the bi-directional, wireless communication channel comprises a communication and control channel to perform bi-direction data transfer directly between said integral transmit and receive device and the external content aggregator operating independently of broadcasters and cable operators.

While certain illustrative embodiments have been described, it is evident that many alternatives, modifications, permutations and variations will become apparent to those skilled in the art in light of the foregoing description.

What is claimed is:

1. A method for transmitting and receiving content and control communication with an entertainment display device, comprising in any operative order:
   providing a transceiver device in two way communication with and co-located with the entertainment display device;
   where the entertainment display device receives content originating at a plurality of content providers from an external content aggregator via a first content delivery channel, and
   where the entertainment display device is in communication with a service provider using a service provider back channel that is controlled by the service provider;
   the transceiver device being adapted to establish a wireless bi-directional back channel with the external content aggregator, where the wireless bi-directional back channel is separate from the first content delivery channel and is separate from the service provider back channel;
   where the wireless bi-directional back channel is carried over a narrowband personal communication service (N-PCS);
   using said wireless bi-directional back channel to establish a direct communication connection between said transceiver device and said external content aggregator, where the external content aggregator accumulates content and command data from a plurality of sources, and processes the received content and command data;
   the transceiver device receiving entertainment content and control communication directly from said external content aggregator via the wireless bi-directional back channel, such entertainment content and control communication being supplemental to content from the content aggregator received via the first content delivery channel;
   the transceiver device presenting said received entertainment content on the display of said entertainment display device;
   the transceiver device collecting response data and content request data sent from a user in response to the entertainment content displayed on the entertainment display device;
   the transceiver device transmitting the response data and content request data directly to the external content aggregator using said wireless bi-directional back channel; and
   where the wireless bi-directional back channel comprises a communication and control channel to perform bi-direction data transfer directly between the transceiver device and the external content aggregator operating independently of the service provider back channel.

2. The method according to claim 1, further comprising storing the content within the transceiver device and formatting said received content for presentation.

3. The method according to claim 1, further comprising storing the collected data within the transceiver device and formatting the collected data for transmission.

4. The method according to claim 1, where the service provider comprises at least one of broadcasters, satellite operators and cable operators.

5. The method according to claim 1, where the entertainment content includes encrypted and non-encrypted content.

6. The method according to claim 1, where the control communication is comprised of at least one of:
   advertising report back messages, program report back messages, cost settlement information, targeted advertising messages, viewing metrics, entertainment display setup messages, entertainment display maintenance messages, and a message that collects a response from a viewer.

7. The method according to claim 1, where the entertainment display device comprises a TV set or digital display device.

8. The method according to claim 1, where the bi-directional, wireless communication channel is used to deliver digital rights management information or entitlement keys directly to the entertainment display device.

9. An apparatus for content and control communication directly with an entertainment display device, comprising:
   a display processor;
   where the entertainment display device receives content originating at a plurality of content providers from an external content aggregator via a first content delivery channel, and
   where the entertainment display device is in communication with a service provider using a service provider back channel that is controlled by the service provider;
   a communications device comprising a processor co-located with the entertainment display device, a transmitter and a receiver;
   the communications device communicating directly between the processor and an external content aggregator device using the transmitter and the receiver, the aggregator device operative to accumulate content and command data from a plurality of sources, process said data, and to transmit the content and control data using a direct wireless bi-directional communication channel separate from a first content delivery channel in communication with the display processor,
   and where the wireless bi-directional back channel operates independently of the service provider back channel, and where the wireless bi-directional back channel is carried over a narrowband personal communication service (N-PCS);
   the aggregator device being further operative to deliver content to the communications device via the first content delivery channel;
   the processor being programmed to carry out the functions of:
      transmitting and receiving entertainment content and control communication to and from the aggregator device over the separate bi-directional, wireless communication channel supplemental to content from the first content delivery channel from the aggregator,
      transferring the entertainment content and command data to the display processor for use by the entertainment display device, and
      performing bi-direction data transfer over the wireless bi-directional back channel directly between said co-located processor and the external content aggregator as an independent back channel; and
   the display processor being programmed to carry out the functions of:
      requesting the display of entertainment content, and
      displaying the entertainment content on the display device where the processor is co-located with the entertainment display.

10. The apparatus according to claim 9, where the aggregator device stores the content and command data.

11. The apparatus according to claim 9, where the entertainment display device comprises a TV, a digital display device or a set-top box.

12. The apparatus according to claim 9, where the processor translates content arriving at the entertainment display device from a narrow band personal communication services technology message into content that may be displayed to a user.

13. The apparatus according to claim 9, where the processor translates content sent from the entertainment display device into a format suitable for transmission to the aggregator device.

14. The apparatus according to claim 9, where the processor is further programmed to display control and command messages to a user via the entertainment display device.

15. The apparatus according to claim 14, where the processor is further programmed to respond to control and command messages sent to a user.

16. An apparatus for content and control communication directly with an entertainment display device, comprising:
   a display processor;
   a communications device comprising a processor co-located with the entertainment display device, a transmitter and a receiver;
   where the entertainment display device receives content originating at a plurality of content providers from an external content aggregator via a first content delivery channel, and
   where the entertainment display device is in communication with a service provider using a service provider back channel that is controlled by the service provider;
   the communications device communicating directly between the processor and an external content aggregator device using the transmitter and the receiver, the aggregator device operative to accumulate content and command data from a plurality of sources, process said data, and to transmit the content and control data using an N-PCS wireless bi-directional communication channel separate from a first content delivery channel;
   and where the wireless bi-directional back channel operates independently of the service provider back channel;
   the aggregator device being further operative to deliver content to the communications device via the first content delivery channel, where the aggregator device stores the content and command data;
   the processor being programmed to carry out the functions of:
      transmitting and receiving entertainment content and control communication to and from the aggregator device over the separate bi-directional, wireless communication channel supplemental to content from the first content delivery channel from the aggregator,
      transferring the entertainment content and command data to the display processor for use by the entertainment display device,
      translating content from the aggregator as an N-PCS message into content that may be displayed on the entertainment display device,
      translating messages sent from the entertainment display device into N-PCS format suitable for transmission to the aggregator, and
      performing bi-direction data transfer over the wireless bi-directional back channel directly between said co-located processor and the external content aggregator as an independent back channel; and
   the display processor being programmed to carry out the functions of:
      requesting the display of entertainment content, and
      displaying the entertainment content on the display device;
   where the processor is co-located with the entertainment display device.

* * * * *